United States Patent
Kawai et al.

(10) Patent No.: US 6,755,014 B2
(45) Date of Patent: Jun. 29, 2004

(54) NOX CLEANING APPARATUS AND NOX CLEANING METHOD FOR INTERNAL COMBUSTION ENGINE

(75) Inventors: Kenji Kawai, Tochigi (JP); Yoshinori Takahashi, Tochigi (JP); Shinichi Saito, Tochigi (JP); Toru Kawatani, Tochigi (JP); Yoshinaka Takeda, Tochigi (JP); Ristuko Shinozaki, Tochigi (JP); Reiko Doumeki, Tochigi (JP); Takeshi Hashizume, Susono (JP); Satoshi Hiranuma, Tochigi (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 0 days.

(21) Appl. No.: 10/329,705

(22) Filed: Dec. 27, 2002

(65) Prior Publication Data

US 2003/0182935 A1 Oct. 2, 2003

(30) Foreign Application Priority Data

Mar. 29, 2002 (JP) ............................ 2002-095987

(51) Int. Cl.$^7$ .............................................. F01N 3/00
(52) U.S. Cl. .......................... 60/286; 60/274; 60/276; 60/295; 60/301
(58) Field of Search ......................... 60/274, 276, 286, 60/295, 299, 301, 303; 422/180, 182, 183

(56) References Cited

U.S. PATENT DOCUMENTS

| | | | | |
|---|---|---|---|---|
| 5,369,956 A | * | 12/1994 | Daudel et al. | 60/286 |
| 5,628,186 A | * | 5/1997 | Schmelz | 60/286 |
| 5,643,536 A | * | 7/1997 | Schmelz | 60/299 |
| 5,833,932 A | * | 11/1998 | Schmelz | 60/303 |
| 6,427,439 B1 | * | 8/2002 | Xu et al. | 60/274 |
| 6,546,720 B2 | * | 4/2003 | van Nieuwstadt | 60/286 |

* cited by examiner

Primary Examiner—Thomas Denion
Assistant Examiner—Tu M. Nguyen
(74) Attorney, Agent, or Firm—Birch, Stewart, Kolasch & Birch, LLP

(57) ABSTRACT

A NOx catalyst for selectively reducing NOx in exhaust gas by adsorbing ammonia is provided at an exhaust system of an engine, ammonia or urea water is supplied to the NOx catalyst by reducing agent supplying means, a consumption amount of ammonia adsorbed to the NOx catalyst is derived by consumption amount deriving means based on an exhaust amount of NOx exhausted from the engine detected or estimated by NOx exhaust amount deriving means and an actual NOx cleaning rate by the NOx catalyst derived by actual NOx cleaning rate deriving means, an actual adsorption amount of ammonia adsorbed to the NOx catalyst is derived in accordance with an addition amount of ammonia and the consumption amount of ammonia by adsorption amount deriving means and the reducing agent supplying means is controlled by controlling means in accordance with the actual adsorption amount.

12 Claims, 7 Drawing Sheets

NOX CLEANING APPARATUS AND NOX CLEANING METHOD FOR INTERNAL COMBUSTION ENGINE

REFERENCE TO RELATED APPLICATION

This non-provisional application claims priority under 35 U.S.C. §119(a) on patent application No. 2002-095987 filed in Japan on Mar. 29, 2002, which is herein incorporated by reference.

BACKGROUND OF THE INVENTION

1. Field of the Invention

The present invention relates to a NOx cleaning apparatus and a NOx cleaning method for an internal combustion engine provided with a NOx catalyst having NOx cleaning operation of exhaust gas under an oxygen rich atmosphere.

2. Description of Related Art

There is known a NOx cleaning apparatus using ammonia generated by hydrolysis by adding urea water into exhaust gas or adding ammonia directly to exhaust gas as a reducing agent of a selective reduction catalyst. When such a NOx cleaning apparatus is mounted to a vehicle having an internal combustion engine, the apparatus is constituted such that a selective reduction catalyst, known as an urea SCR catalyst (hereinafter, referred to as 'NOx catalyst') capable of cleaning NOx of exhaust gas under an oxygen rich atmosphere, is arranged at an exhaust system of the internal combustion engine and urea water or ammonia is added to exhaust gas from an upstream side of the catalyst and supplied to the NOx catalyst as a reducing agent.

Generally, a NOx cleaning rate in a NOx cleaning apparatus is much dependent on the performance of the NOx catalyst, and the above-described NOx catalyst constituting a reducing agent by ammonia is provided with a property of processing to reduce NOx at a high efficiency in a region of the temperature exceeding 350° C.

When urea water is added to exhaust gas, ammonia ($NH_3$) is generated by being subjected to hydrolysis and thermolysis as shown by Equation (1).

$$(NH_2)_2CO + H_2O \rightarrow 2NH_3 + CO_2 \quad (1)$$

According to a denitrification between ammonia ($NH_3$) and a nitrogen oxide (NOx) on the NOx catalyst, the reaction is carried out respectively in accordance with high or low of catalyst temperature, that is, mainly by Equation (2) at high temperature and mainly by Equation (3) at low temperature.

$$4NH_3 + 4NO + O_2 \rightarrow 4N_2 + 6H_2O \quad (2)$$

$$2NH_3 + NO + NO_2 \rightarrow 2N_2 + 3H_2O \quad (3)$$

According to such a NOx catalyst constituting a reducing agent by ammonia, as shown by a bold line in FIG. 8, the adsorption amount of ammonia to the NOx catalyst increases as the NOx cleaning rate increases. Therefore, it is preferable to control the ammonia adsorption amount to be high in order to achieve the high cleaning rate of the NOx catalyst in a low temperature region. There is a limit in the ammonia adsorption amount capable of being adsorbed by the NOx catalyst and an adsorption limit value shown by a bold line (n) in FIG. 9 is dependent on the catalyst temperature.

When the NOx cleaning apparatus having the NOx catalyst of such a property is mounted to a vehicle, an operating state of the vehicle is continuously changed and a flow rate of exhaust gas exhausted from the internal combustion engine, an amount of NOx in exhaust gas and the catalyst temperature are significantly changed. Therefore, it is necessary to supply ammonia to the NOx catalyst in correspondence with the operating state of the vehicle. When supply of ammonia to the NOx catalyst cannot correspond to the operating state, for example, when the amount of supply of ammonia is deficient, the ammonia adsorption amount to the NOx catalyst becomes deficient and NOx cannot be reduced sufficiently. When the amount of supply of ammonia is excessively large and exceeds the adsorption limit value, a phenomenon referred to as ammonia slip, in which ammonia that has not been adsorbed to the NOx catalyst is exhausted to the atmosphere, is liable to be brought about.

SUMMARY OF THE INVENTION

The present invention resolves such a problem and it is an object thereof to provide a NOx cleaning apparatus and a NOx cleaning method for an internal combustion engine capable of effectively restraining ammonia slip from being brought about while maintaining a high NOx cleaning rate.

A NOx cleaning apparatus for an internal combustion engine, according to the invention, includes a NOx catalyst provided at an exhaust system of the internal combustion engine for selectively reducing NOx in an exhaust gas by adsorbing a reducing agent, a reducing agent supplying unit that supplies the reducing agent to the NOx catalyst, a NOx exhaust amount deriving unit that detects or estimates an exhaust amount of NOx exhausted from the internal combustion engine, an actual NOx cleaning rate deriving unit that derives an actual NOx cleaning rate by the NOx catalyst, a consumption amount deriving unit for deriving a consumption amount of the reducing agent absorbed to the NOx catalyst based on the NOx exhaust amount detected or estimated by the NOx exhaust amount deriving unit and the actual cleaning rate derived by the actual NOx cleaning rate deriving unit, an adsorption amount deriving unit that derives an actual adsorption amount of the reducing agent adsorbed to the NOx catalyst in accordance with the consumption amount of the reducing agent derived by the consumption amount deriving unit and an addition amount of the reducing agent by the reducing agent supplying unit, and a controlling unit that controls the reducing agent supplying unit in accordance with the actual adsorption amount derived by the adsorption amount deriving unit.

Therefore, according to the present invention, by detecting the actual adsorption amount of the reducing agent adsorbed to the NOx catalyst, a pertinent amount of the reducing agent can be supplied to constitute the adsorption amount of the reducing agent necessary for reducing the NOx exhaust amount and a high NOx cleaning rate and a reduction in the reducing agent, for example, ammonia slip can be made compatible with each other.

BRIEF DESCRIPTION OF DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
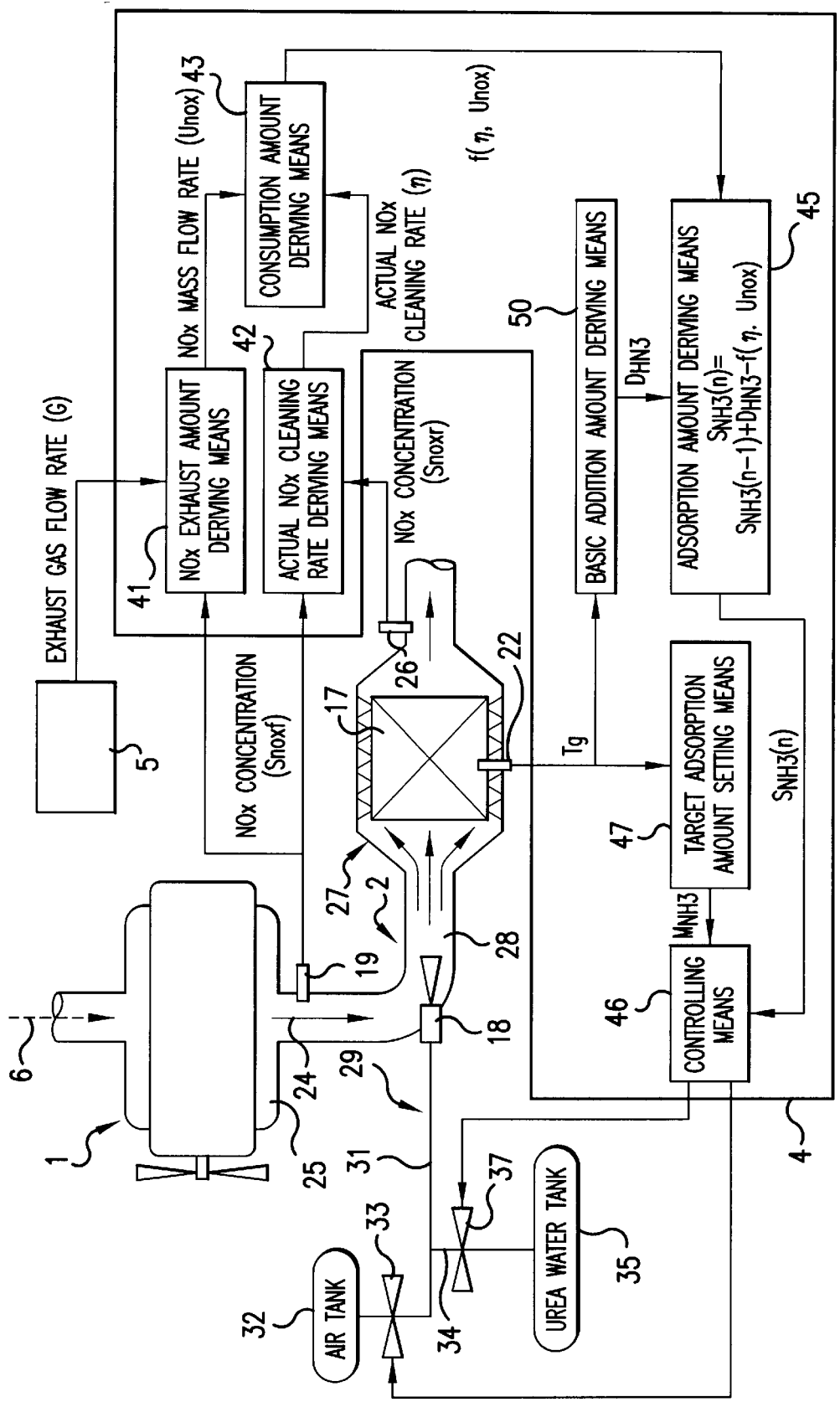
FIG. 1 is an entire structural view of a NOx cleaning apparatus according to a first embodiment of the invention.

A NOx cleaning apparatus of an internal combustion engine according to a first embodiment of the invention will be explained in conjunction with the drawings. In FIG. 1, reference numeral 1 designates a diesel engine (hereinafter, referred to as an "engine") mounted to a vehicle, not illustrated. An output of the engine 1 is controlled by an engine control apparatus 5. In this case, the engine control apparatus 5 derives an exhaust gas flow rate G from a suction flow rate (i.e., flow rate of intake air 6) and a fuel injection amount to output to an exhaust gas control apparatus 4.

Essential portions of the exhaust gas control apparatus 4 and the engine control apparatus 5 are constituted by well-known microcomputers which are connected to communicate with each other by a control system communication network. The exhaust gas flow rate G may be derived from an engine revolution speed and the fuel injection amount.

The NOx cleaning apparatus is provided with a NOx catalyst 17, installed in an exhaust pipe 28 that communicates with an exhaust manifold 25 of the engine 1 and constitutes an exhaust system 2 for selectively reducing NOx in exhaust gas, a reducing agent supplying unit 29 for supplying ammonia to the NOx catalyst 17, a NOx exhaust amount deriving unit 41 for estimating a NOx mass flow rate Unox as a NOx exhaust amount exhausted from the engine 1, an actual NOx cleaning rate deriving unit 42 for deriving an actual NOx cleaning rate by the NOx catalyst 17, a consumption amount deriving unit 43 for deriving a consumption amount $f(\eta, Unox)$ of ammonia adsorbed to the NOx catalyst 17 based on the NOx mass flow rate Unox estimated by the NOx exhaust amount deriving unit 41 and the actual NOx cleaning rate $\eta$ derived by the actual NOx cleaning rate deriving unit 42, adsorption amount deriving unit 45 for deriving an actual adsorption amount $S_{NH3}(n)$ of ammonia adsorbed to the NOx catalyst 17 in accordance with an addition amount $D_{NH3}$ of ammonia by the reducing agent supplying unit 29 and the consumption amount $f(\eta, Unox)$ of ammonia derived by the consumption amount deriving unit 43, a target adsorption amount setting unit 47 for setting a target adsorption amount $M_{NH3}$ of ammonia with respect to the NOx catalyst 17, a controlling unit 46 for controlling the reducing agent supplying unit 29 in accordance with a result of comparison between the actual adsorption amount $S_{NH3}(n)$ derived by the adsorption deriving unit 45 and the target adsorption amount $M_{NH3}$ set by the target adsorption amount setting unit means 47, and a basic addition amount deriving unit 50 for deriving a basic addition amount $D_{NH3}$ of ammonia.

The NOx catalyst 17 is constituted by adhering a catalyst component to a catalyst carrier of a honeycomb structure and contained in a casing of a NOx catalyst converter 27 provided at the exhaust pipe 28. As the NOx catalyst 17 constituting the selective reduction catalyst, there are vanadium species, platinum species, zeolite species and the like. The NOx catalyst 17 selectively reduces NOx in exhaust gas 24 by adsorbing ammonia ($NH_3$). In an ammonia adsorbing state, the NOx catalyst 17 expedites a denitrification between $NH_3$ and a nitrogen oxide in accordance with high or low of atmospheric temperature of NOx in the exhaust gas 24 by mainly carrying out the reaction of Equation (2) at high temperature and Equation (3) at low temperature.

The NOx catalyst 17 is provided with a catalyst temperature sensor 22 for outputting catalyst temperature Tg. Otherwise, an estimated value of catalyst temperature may be calculated to be used as the catalyst temperature Tg in consideration of parameters correlated with a catalyst temperature, for example, the engine revolution speed and the fuel injection amount, an operating time period at respective engine operating region and outside temperature.

The reducing agent supplying means 29 is provided with an addition nozzle 18 mounted to the exhaust pipe 28 between a preceding NOx sensor 19 and the NOx catalyst 17 for spraying urea water to an upstream opening side of the NOx catalyst converter 27, an injection pipe 31 connected to the addition nozzle 18, an air tank 32 connected to an upstream end of the injection pipe 31, a compressed air control valve 33 for controlling supply of compressed air to the injection pipe 31, a urea water supply pipe 34 connected to the injection pipe at a position downstream from the compressed air control value 33, a urea water tank 35 containing urea water to be sprayed, and a urea water supply portion 37 for controlling supply of urea water in the urea water tank 35 from the urea water supply pipe 34 to the injection pipe 31. The compressed air control valve 33 and the urea water supply portion 37 are connected to the controlling means 46 by signal lines.

The NOx exhaust amount deriving means 41 derives the NOx mass flow rate Unox based on a NOx concentration Snoxf on an upstream side of the NOx catalyst 17 detected by the preceding NOx sensor 19 arranged at the exhaust pipe 28 on the upstream side of the NOx catalyst 17 and the exhaust gas flow rate G from the engine control apparatus 5 in correspondence with an exhaust amount of exhaust gas exhausted from the engine 1.

The exhaust pipe 28 on the downstream side of the NOx catalyst 17 is arranged with a succeeding NOx sensor 26 for detecting a NOx concentration Snoxr on the downstream side of the NOx catalyst 17. The NOx concentrations Snoxf and Snoxr from the respective NOx sensors 19 and 26 are outputted to the actual NOx cleaning rate deriving means 42.

The actual NOx cleaning rate deriving means 42 is an operation circuit for calculating the actual NOx cleaning rate ($\eta$) by processing the NOx concentrations Snoxf and Snoxr form the respective NOx sensors 19 and 26 to calculate a difference there between Snox−Snoxr and dividing a value of the difference by Snoxf.

Figure 3:
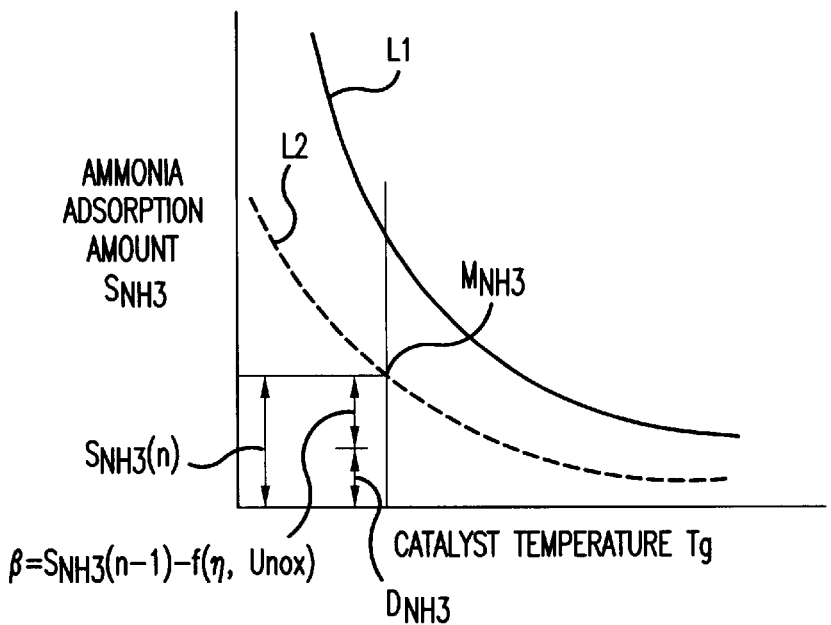
FIG. 3 is a map used in the first embodiment showing a relationship between exhaust temperature and an ammonia adsorption amount in a state in which a target adsorption amount and an actual adsorption amount coincide with each other.
Figure 4:
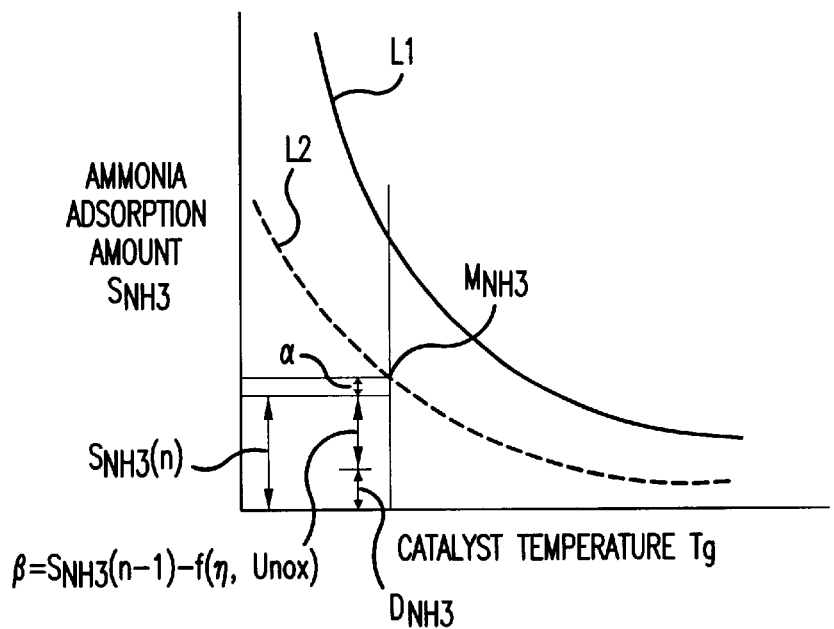
FIG. 4 is a map used in the first embodiment showing a relationship between exhaust temperature and an ammonia adsorption amount when the target adsorption amount and the actual adsorption amount do not coincide with each other.

The basic addition amount deriving means 50 is provided with a basic addition amount map of ammonia previously set in accordance with an engine operating state to suffice the ammonia adsorption amount at the NOx catalyst 17 shown by broken lines L2 in FIG. 3 and FIG. 4 for selecting the basic additional amount $D_{NH3}$ of ammonia pertinently in accordance with the catalyst temperature Tg to output to the adsorption amount deriving means 45.

The target adsorption amount setting means 47 is a map for setting the target adsorption amount $M_{NH3}$ of ammonia adsorbed to the NOx catalyst 17 in accordance with the catalyst temperature Tg detected or estimated by catalyst temperature detecting means.

The adsorption deriving means 45 is an operation circuit for deriving an estimated actual adsorption amount $S_{NH3}(n)$ by Equation (4) shown below based on an actual adsorption amount $S_{NH3}(n-1)$ derived at a preceding time, the basic addition amount $D_{NH3}$ of ammonia derived by the basic addition amount deriving means 50 and the ammonia consumption amount $f(\eta, Unox)$ derived at a current time.

$$S_{NH3}(n)=S_{NH3}(n-1)+D_{NH3}-f(\eta, Unox) \quad (4)$$

According to the embodiment, the exhaust gas control apparatus 4 is constituted by the NOx exhaust amount deriving means 41, the actual NOx cleaning rate deriving means 42, the consumption amount deriving means 43, the adsorption amount deriving means 45, the controlling means 46 and the target adsorption rate setting means 47, and the basic addition amount deriving means 50. The controlling means 46 controls to drive the compressed air control valve 33 and the urea water supply portion 37.

Next, NOx control processings by the NOx cleaning apparatus will be explained in accordance with a NOx cleaning processing routine of FIG. 2.

In driving the engine 1 of a vehicle, not illustrated, mounted with the NOx cleaning apparatus, the engine control apparatus 5 confirms whether a self check result is normal or whether operation of related apparatus and sensors pertinently carried out by a plurality of control systems, for example, a fuel injection system, a fuel supply system and the like is normal and in the case of normal (OK), carries out a control by transmitting control signals to the fuel injection system and the fuel supply system in accordance with respective input values of the above-mentioned respective sensors and transmits sensor outputs and the like obtained at the occasion also to the exhaust gas control apparatus 4.

Figure 2:
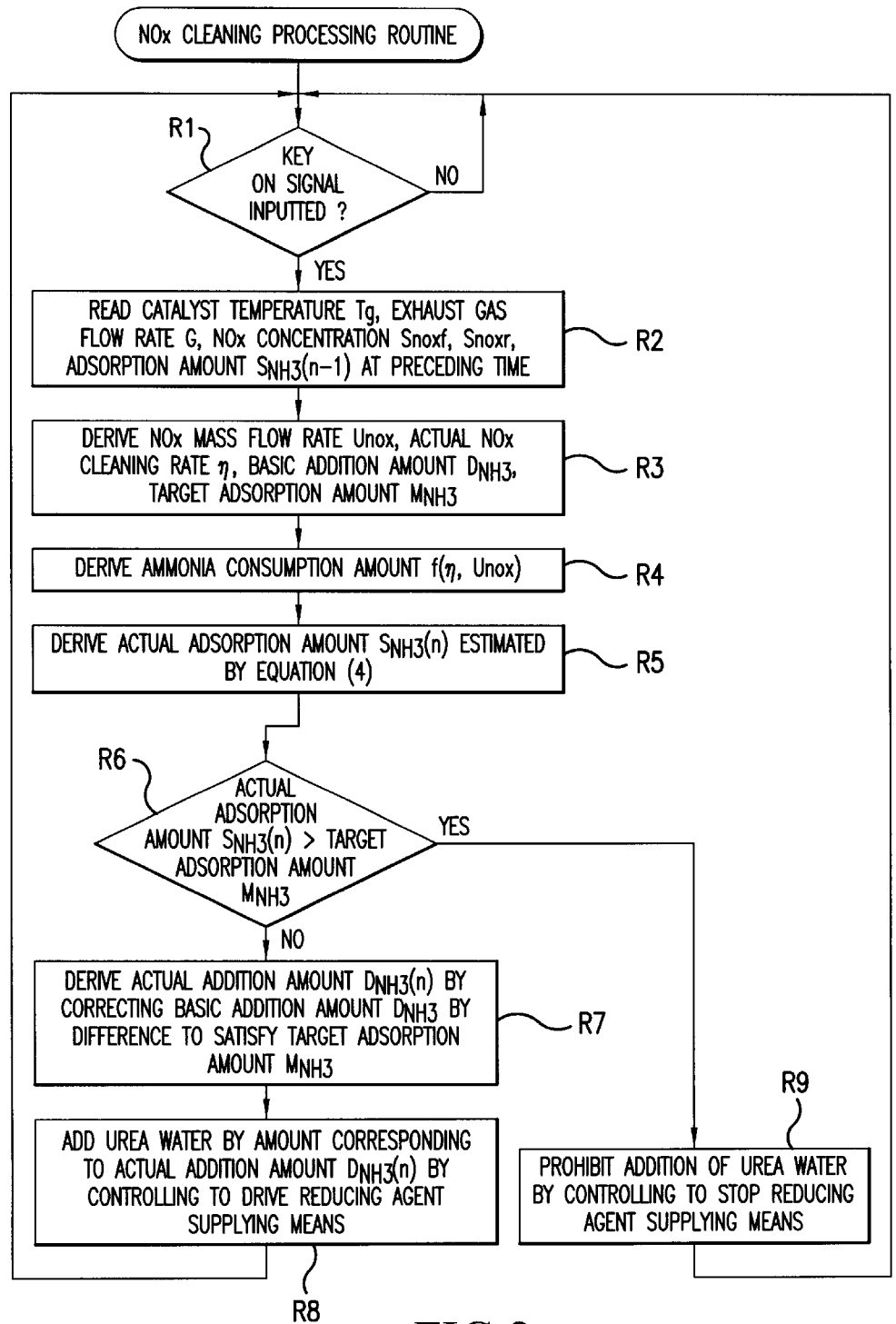
FIG. 2 is a flow chart showing a routine of NOx cleaning processings carried out in the first embodiment.

The exhaust gas control apparatus 4 repeats a NOx cleaning processing control of the NOx cleaning processing routine of FIG. 2 simultaneously with ON of an engine key at every predetermined control cycle. The exhaust gas control apparatus 4 confirms key ON at step R1 and inputs data of the catalyst temperature Tg, the exhaust gas flow rate G, the NOx concentrations Snoxf, Snoxr, the adsorption amount $S_{NH3}(n-1)$ at a preceding time and the like at step R2.

At step R3, the exhaust gas control apparatus 4 respectively calculates the NOx mass flow rate Unox by using the exhaust gas flow rate G and the NOx concentration Snoxf and the actual NOx cleaning rate $\eta$ by using the NOx concentrations Snoxf, Snoxr, calculates the basic addition amount $D_{NH3}$ of ammonia as an amount of ammonia to be adsorbed newly to the NOx catalyst 17 based on the catalyst temperature Tg, calculates the target adsorption amount $M_{NH3}$ in correspondence with the catalyst temperature Tg from the map constituting the target adsorption amount setting means 47 and proceeds to step R4.

At step R4, the exhaust gas control apparatus 4 derives the consumption amount $f(\eta, Unox)$ based on the NOx mass flow rate Unox and the actual NOx cleaning rate $\eta$ and calculates to derive the actual adsorption amount $S_{NH3}(n)$ of ammonia by using Equation (4) at step R5.

At step R6, the exhaust gas control apparatus 4 compares the actual consumption amount $S_{NH3}(n)$ and the target adsorption amount $M_{NH3}$ and, when the actual adsorption amount $S_{NH3}(n)$ exceeds the target adsorption amount $M_{NH3}$, there is a concern of ammonia slip and therefore, proceeds to step R9, prohibits addition of urea water at the urea water supply portion 37 to control to stop the reducing agent supplying means 29 to thereby finish the current time control cycle.

When the actual adsorption amount $S_{NH3}(n)$ does not exceed the target adsorption amount $M_{NH3}$, the exhaust gas control apparatus 4 proceeds to step R7, corrects the basic addition amount $D_{NH3}$ of ammonia by a difference there between to satisfy the target adsorption amount $M_{NH3}$ to thereby derive an actual ammonia addition amount $D_{NH3}(n)$ and proceeds to step R8. At step R8, the exhaust gas control apparatus 4 does not correct the basic addition amount $D_{NH3}$ in the case of the actual adsorption amount $S_{NH3}(n)$=the target adsorption amount $M_{NH3}$ as shown by FIG. 3 and adds a difference $\alpha$ to the basic addition amount $D_{NH3}$ in the case of the actual adsorption amount $S_{NH3}(n)$ is less than the target adsorption amount $M_{NH3}$ as shown by FIG. 4. At step R8, the current time control cycle is finished by controlling to drive the urea water supply portion 37 of the reducing agent supplying means 29.

By control operation at step R8, the urea water supply portion 37 supplies urea water in correspondence with an amount of ammonia of the actual addition amount $D_{NH3}(n)$ or the basic addition amount $D_{NH3}$ of ammonia from the addition nozzle 18 to the exhaust pipe 28 via the injection pipe 31.

According to the embodiment, the reducing agent supplying means 29 is controlled by the controlling means 46 in accordance with the result of comparing the actual adsorption amount $S_{NH3}(n)$ and the target adsorption amount $M_{NH3}$ and therefore, even when there is an error in the actual adsorption $S_{NH3}(n)$, the basic addition amount $D_{NH3}$ of ammonia is pertinently corrected and therefore, a pertinent amount of ammonia can be supplied to the NOx catalyst 17 and adsorbed to the NOx catalyst 17 to constitute the ammonia adsorption amount necessary for reducing the NOx exhaust amount and the ammonia slip can effectively be restrained from being brought about while maintaining a high NOx cleaning rate.

When the accuracy of the actual adsorption amount $S_{NH3}(n)$ is extremely high, there may be constituted a control mode of adding the actual addition amount $D_{NH3}$ for correcting the basic addition amount in correspondence with the ammonia consumption amount f without comparing the actual consumption amount $S_{NH3}(n)$ and the target adsorption amount $M_{NH3}$.

Figure 5:
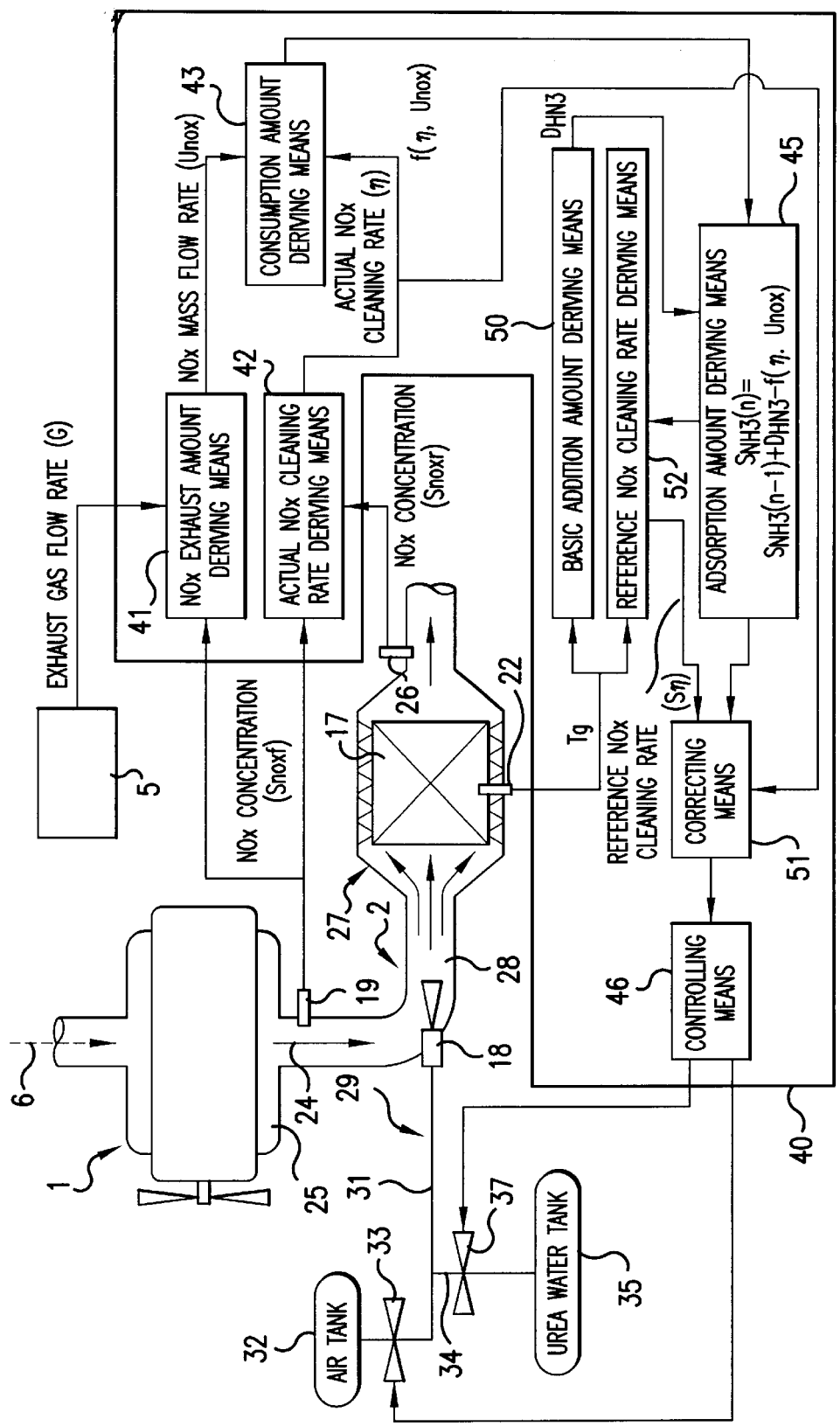
FIG. 5 is an entire structural view of a NOx cleaning apparatus according to a second embodiment of the invention.

A NOx cleaning apparatus of an internal combustion engine according to a second embodiment of the invention will be explained in reference to FIG. 5. The NOx cleaning apparatus according to the embodiment is constructed by a constitution basically the same as that of the first embodiment except that a constitution of an exhaust gas control apparatus 40 differs from that of the exhaust gas control apparatus 4. Therefore, the same notations are attached to constitutions having functions the same as those of the first embodiment shown in FIG. 1 and a detailed explanation thereof will be omitted.

A characteristic of the exhaust gas control apparatus 40 resides in providing reference NOx cleaning rate deriving means 52 for deriving a reference NOx cleaning rate Sη based on the actual adsorption amount $S_{NH3}(n)$ derived by the adsorption amount deriving means 45 and the catalyst temperature Tg of the NOx catalyst 17 or parameters correlated with the catalyst temperature and correcting means 51 for correcting the actual NOx cleaning rate η derived by the actual NOx cleaning rate deriving means 42 in accordance with a result of comparing the reference NOx cleaning rate Sη derived by the reference NOx cleaning rate deriving means 52 and the actual NOx cleaning rate (η) derived by the actual NOx cleaning rate deriving means 42 and controlling the reducing agent supplying means 29 by the controlling means 46 in accordance with the actual adsorption amount $S_{NH3}(n)$ corrected by the correcting means 51.

Figure 7:
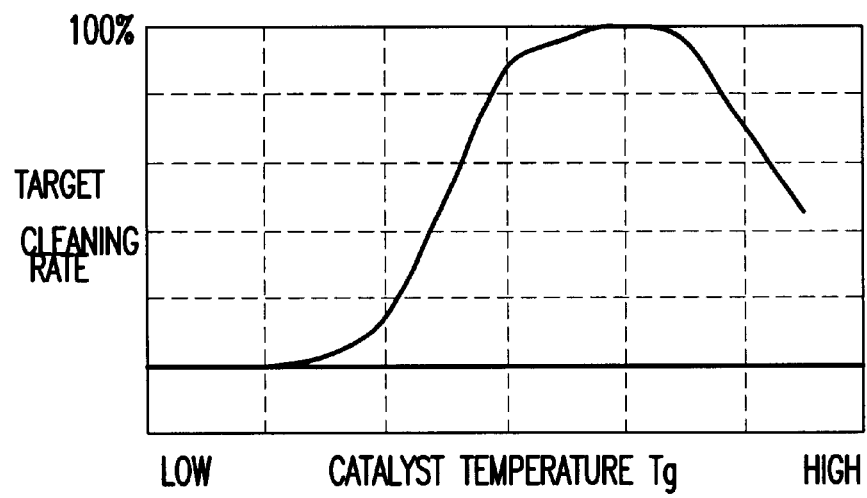
FIG. 7 is a diagram showing a relationship between exhaust temperature and a reference cleaning rate used in the second embodiment.
Figure 8:
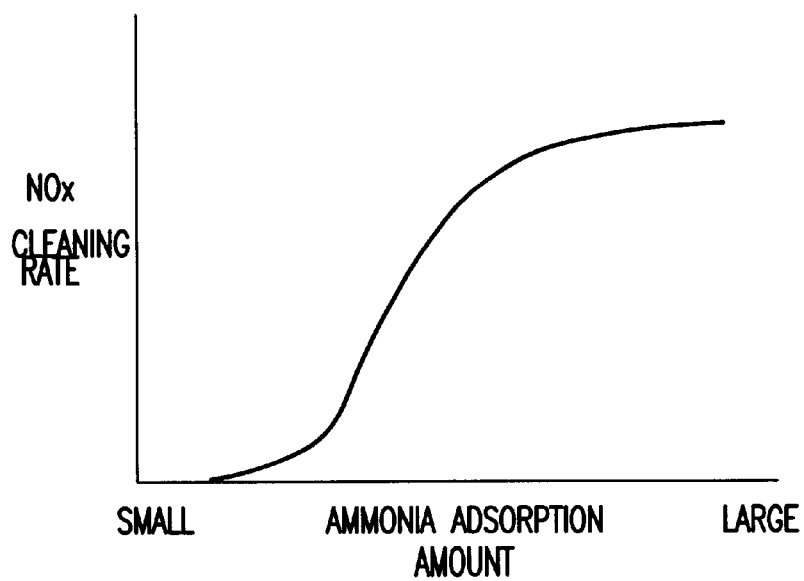
FIG. 8 is a diagram showing a relationship between an ammonia adsorption amount and a NOx cleaning rate of a NOx catalyst.
Figure 9:
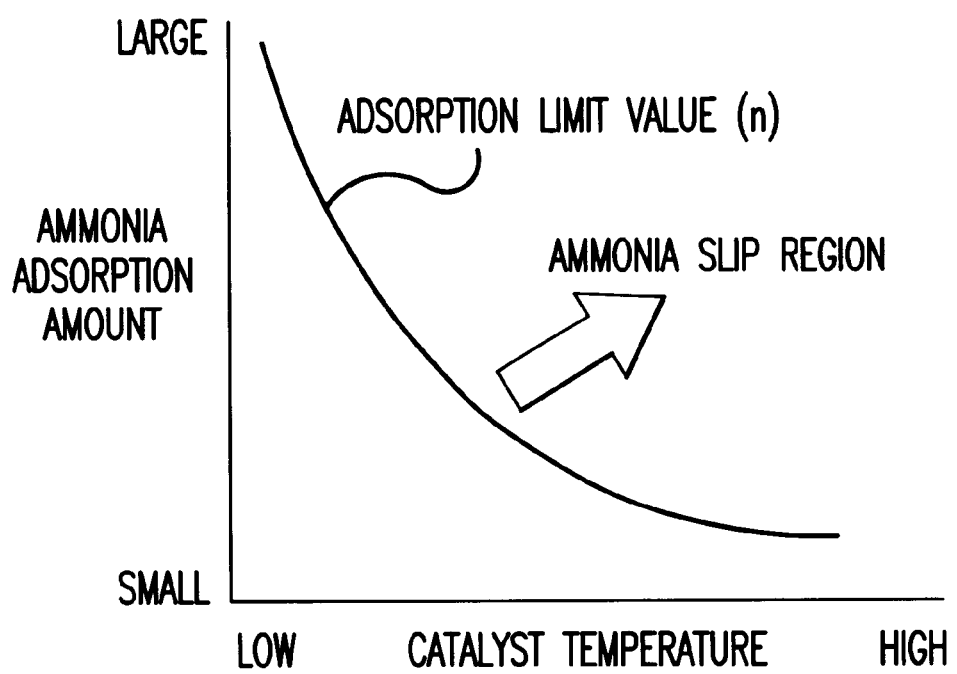
FIG. 9 is a diagram showing a relationship between catalyst temperature and an ammonia adsorption amount of a NOx catalyst.

The reference NOx cleaning rate deriving means 52 derives the reference NOx cleaning rate Sη from a relationship between the catalyst temperature Tg and the target cleaning rate as shown by FIG. 7 and the relationship between the ammonia adsorption amount and the NOx cleaning rate as shown by FIG. 8.

Next, NOx control processings by the NOx cleaning apparatus according to the second embodiment will be explained in accordance with a NOx cleaning processing routine of FIG. 6.

Figure 6:
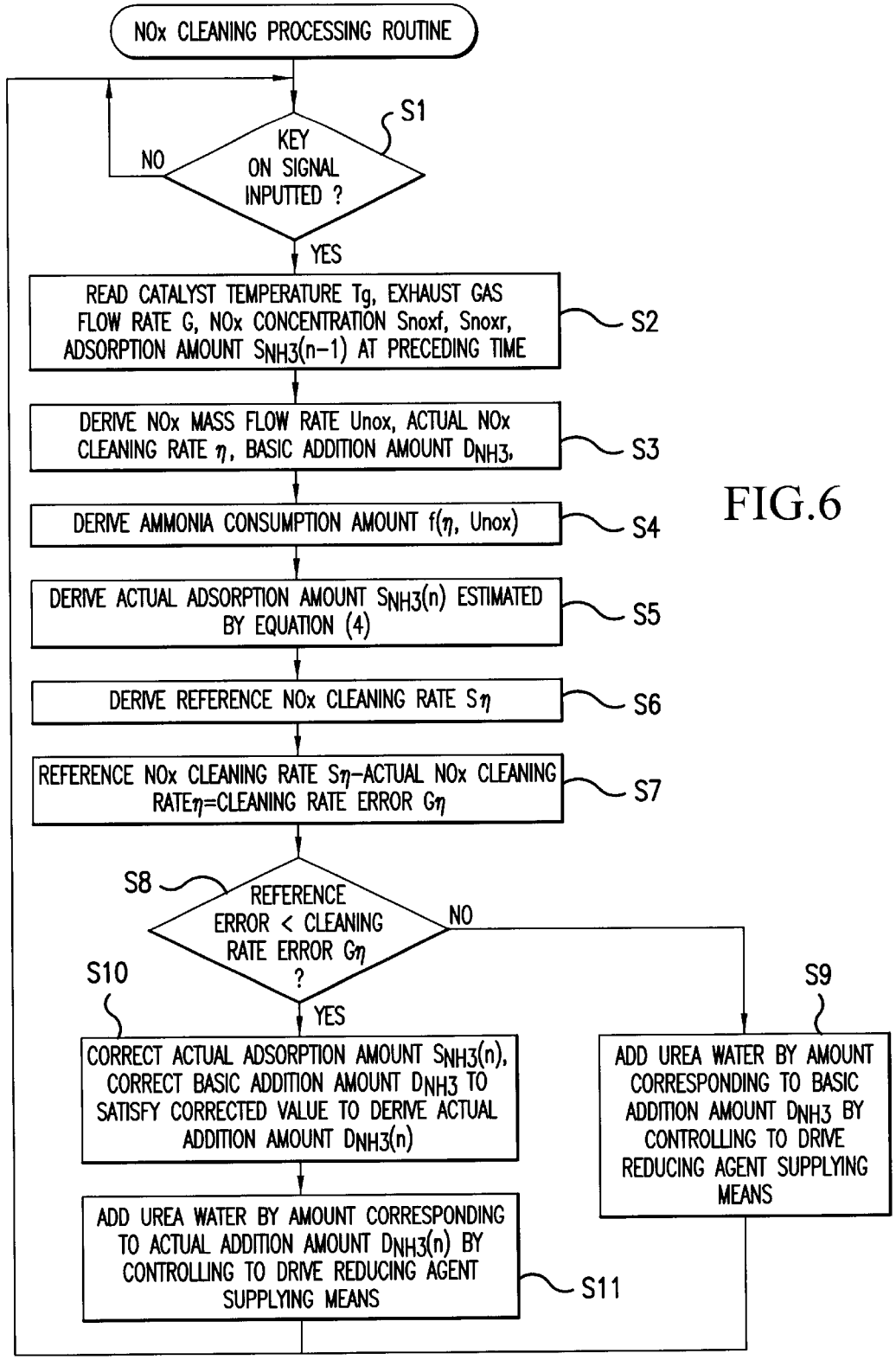
FIG. 6 is a flow chart showing a routine of NOx cleaning processings carried out in the second embodiment.

The exhaust gas control apparatus 40 repeats a NOx cleaning processing control of the NOx cleaning processing routine of FIG. 6 at every predetermined control cycle simultaneous with ON of an engine key. At step S1, the exhaust gas control apparatus 40 confirms key ON and inputs data of the catalyst temperature Tg, the exhaust gas flow rate G, the NOx concentrations Snoxf, Snoxr, the adsorption amount $S_{NH3}(n-1)$ at a preceding time and the like at step S2.

At step S3, the exhaust gas control apparatus 40 respectively calculates the NOx mass flow rate Unox by using the exhaust gas flow rate G and the NOx concentration Snoxf and calculates the actual NOx cleaning rate η n by using the NOx concentrations Snoxf, Snoxr, calculates the basic addition amount $D_{NH3}$ of ammonia as an amount of ammonia to be adsorbed to the NOx catalyst 17 newly based on the catalyst temperature Tg from the map of the basic addition amount deriving means 50 and proceeds to step S4.

At step S4, the exhaust gas control apparatus 40 derives the consumption amount f(η, Unox) based on the NOx mass flow rate Unox and the actual NOx cleaning rate η n and proceeds to step S5, derives to calculate the actual adsorption amount $S_{NH3}(n)$ by using equation (4) at step S5 and proceeds to step S6.

At step S6, the exhaust gas control apparatus 40 calculates the reference NOx cleaning rate Sη in correspondence with the actual adsorption amount $S_{NH3}(n)$ and the catalyst temperature Tg and proceeds to step S7.

At step S7, the exhaust gas control apparatus 40 calculates a cleaning rate error Gη from the reference NOx cleaning rate Sη and the actual NOx cleaning rate η and proceeds to step S8. At step S8, the exhaust gas control apparatus 40 compares a previously set reference error Z and the cleaning rate error Gη and, when the cleaning rate error Gη falls in a range of the reference error Z, proceeds to step S9 and controls to drive the urea water supply portion 37 of the reducing agent supplying means 29 to supply an amount of urea water by an amount in correspondence with ammonia of the reference addition amount $D_{NH3}$ in order to add the reference addition amount $D_{NH3}$ of ammonia satisfying the actual adsorption amount $S_{NH3}(n)$ to thereby finish the current time control cycle.

When the cleaning rate error Gη is deviated from the range of the reference error Z, the exhaust gas control apparatus 40 proceeds to step S10, corrects the actual adsorption amount $S_{NH3}(n)$, corrects the basic addition amount $D_{NH3}$ to satisfy the corrected value to thereby derive the actual additional amount $D_{NH3}(n)$ and proceeds to step S11. At step S11, the exhaust gas control apparatus 40 controls to drive the urea water supply portion 37 of the reducing agent supplying means 29 to supply an amount of urea water by an amount in correspondence with ammonia of the actual addition amount $D_{NH3}(n)$ in order to add the corrected actual addition amount $D_{NH3}(n)$ to thereby finish the current time control cycle.

By the control operation at steps S9, S11, the urea water supply portion 37 supplies urea water controlled to a flow rate in correspondence with an ammonia amount of the actual addition amount $D_{NH3}(n)$ or the basic addition amount $D_{NH3}$ from the addition nozzle 18 to the exhaust pipe 28 via the injection pipe 31.

According to the second embodiment, the actual adsorption amount $S_{NH3}(n)$ is corrected in accordance with a result of comparing the reference NOx cleaning rate Sη and the actual NOx cleaning rate η. Therefore, when the difference between the reference NOx cleaning rate Sη n and the actual NOx cleaning rate η n exceeds the reference error Z, the actual adsorption amount $S_{NH3}(n)$ is corrected and the reducing agent supplying means 29 is controlled by the controlling means 46 based on the corrected actual adsorption amount $S_{NH3}(n)$. Accordingly, even when there is an error in the actual adsorption amount $S_{NH3}(n)$, the basic addition amount $D_{NH3}$ of ammonia is pertinently corrected and therefore, ammonia can be adsorbed to the NOx catalyst 17 by supplying a pertinent amount of ammonia to the NOx catalyst 17 to constitute an ammonia adsorption amount necessary for reducing the NOx exhaust amount and the ammonia slip can effectively be restrained from being brought about while maintaining the high NOx cleaning rate.

What is claimed is:

1. A NOx cleaning apparatus of an internal combustion engine, comprising:

a NOx catalyst provided at an exhaust system of the internal combustion engine for selectively reducing NOx in an exhaust gas by adsorbing a reducing agent;

a reducing agent supplying unit for supplying the reducing agent to the NOx catalyst;

a NOx exhaust amount deriving unit for one of detecting and estimating an exhaust amount of NOx exhausted from the internal combustion engine;

an actual NOx cleaning rate deriving unit for deriving an actual NOx cleaning rate by the NOx catalyst;

a consumption amount deriving unit for deriving a consumption amount of the reducing agent absorbed to the NOx catalyst based on the NOx exhaust amount detected or estimated by the NOx exhaust amount deriving unit and the actual NOx cleaning rate derived by the actual NOx cleaning rate deriving unit;

an adsorption amount deriving unit for deriving an actual adsorption amount of the reducing agent adsorbed to the NOx catalyst in accordance with a sum of a difference of an addition amount of the reducing agent by the reducing agent supplying unit and the consumption amount of the reducing agent derived by the consumption amount deriving unit and a derived value of the adsorption amount at a preceding time by the adsorption amount deriving unit; and a controlling unit for controlling the reducing agent supplying unit in accordance with the actual adsorption amount derived by the adsorption amount deriving unit.

2. The NOx cleaning apparatus of an internal combustion engine according to claim 1, wherein the actual NOx cleaning rate deriving unit derives the actual NOx cleaning rate from a difference or a ratio of an upstream side NOx concentration detected by a preceding NOx sensor provided at the exhaust system on an upstream side of the NOx catalyst and a downstream side NOx concentration detected by a succeeding NOx sensor provided at the exhaust system on a downstream side of the NOx catalyst.

3. The NOx cleaning apparatus of an internal combustion engine according to claim 1, wherein the reducing agent supplied by the reducing agent supplying unit is ammonia or urea water.

4. The NOx cleaning apparatus of an internal combustion engine according to claim 3, wherein the controlling unit controls the reducing agent supplying unit such that the actual adsorption amount falls at a vicinity of a limit amount at which ammonia slip is not brought about at the NOx catalyst.

5. A NOx cleaning method of an internal combustion engine having,

NOx catalyst provided at an exhaust system of the internal combustion engine for selectively reducing NOx in an exhaust gas by adsorbing a reducing agent, and a reducing agent supplying unit for supplying the reducing agent to the NOx catalyst, said method comprising:
(a) a step of detecting or estimating an exhaust amount of NOx exhausted from the internal combustion engine;
(b) a step of deriving an actual NOx cleaning rate by the NOx catalyst;
(c) a step of deriving a consumption amount of the reducing agent adsorbed to the NOx catalyst based on the detected or estimated exhaust amount of NOx detected or estimated in the step (a) and the actual NOx cleaning rate derived in the step (b);
(d) a step of deriving an actual adsorption amount of the reducing agent adsorbed to the NOx catalyst in accordance with a sum of a difference of an addition amount of the reducing agent by the reducing agent supplying unit and the consumption amount of the reducing agent derived in the step (c) and a derived value of the adsorption amount at a preceding time in the step (d); and
(e) a step of controlling the reducing agent supplying unit in accordance with the actual adsorption amount derived in the step (d).

6. The NOx cleaning method of an internal combustion engine according to claim 5, wherein the step (b) derives the actual NOx cleaning rate from a difference or a ratio of an upstream side NOx concentration detected in the exhaust system on an upstream side of the NOx catalyst and a downstream side NOx concentration detected in the exhaust system on a downstream side of the NOx catalyst.

7. The NOx cleaning method of an internal combustion engine according to claim 5, wherein the reducing agent supplied by the reducing agent supplying unit is ammonia or urea water.

8. The NOx cleaning method of an internal combustion engine according to claim 7, wherein the step (f) controls the reducing agent supplying unit such that the actual adsorption amount falls at a vicinity of a limit amount at which ammonia slip is not brought about at the NOx catalyst.

9. An NOx cleaning apparatus of an internal combustion engine, comprising:

a NOx catalyst provided at an exhaust system of the internal combustion engine for selectively reducing NOx in an exhaust gas by adsorbing a reducing agent;

a reducing agent supplying unit for supplying the reducing agent to the NOx catalyst;

a NOx exhaust amount deriving unit for one of detecting and estimating an exhaust amount of NOx exhausted from the internal combustion engine;

an actual NOx cleaning rate deriving unit for deriving an actual NOx cleaning rate by the NOx catalyst;

a consumption amount deriving unit for deriving a consumption amount of the reducing agent absorbed to the NOx catalyst based on the NOx exhaust amount detected or estimated by the NOx exhaust amount deriving unit and the actual NOx cleaning rate derived by the actual NOx cleaning rate deriving unit;

an adsorption amount deriving unit for deriving an actual adsorption amount of the reducing agent adsorbed to the NOx catalyst in accordance with the consumption amount of the reducing agent derived by the consumption amount deriving unit and an addition amount of the reducing agent by the reducing agent supplying unit;

a target adsorption amount setting unit for setting a target adsorption amount of the reducing agent with respect to the NOx catalyst in accordance with one of a catalyst temperature of the NOx catalyst and a parameter correlated with the catalyst temperature; and a controlling unit for controlling the reducing agent supplying unit in accordance with a result of comparing the actual adsorption amount derived by the adsorption amount deriving unit and the target adsorption amount set by the target adsorption amount setting unit.

10. An NOx cleaning apparatus of an internal combustion engine having, a NOx catalyst provided at an exhaust system of the internal combustion engine for selectively reducing NOx in an exhaust gas by adsorbing a reducing agent, and a reducing agent supplying unit for supplying the reducing agent to the NOx catalyst, said method comprising:
(a) a step of detecting or estimating an exhaust amount of NOx exhausted from the internal combustion engine;
(b) a step of deriving an actual NOx cleaning rate by the NOx catalyst;
(c) a step of deriving a consumption amount of the reducing agent adsorbed to the NOx catalyst based on the detected or estimated exhaust amount of NOx detected or estimated in the step (a) and the actual NOx cleaning rate derived in the step (b);
(d) a step of deriving an actual adsorption amount of the reducing agent adsorbed to the NOx catalyst in accordance with a sum of a difference of an addition amount of the reducing agent by the reducing agent supplying unit and the consumption amount of the reducing agent derived in the step (c) and a derived value of the adsorption amount at a preceding time in the step (d);
(e) a step of setting a target adsorption amount of the reducing agent with respect to the NOx catalyst in accordance with a catalyst temperature of the NOx catalyst or a parameter correlated with the catalyst temperature; and
(f) a step of controlling the reducing agent supplying unit in accordance with a result of comparing the actual adsorption amount derived in the step (d) and the target adsorption amount set in the step (e).

11. An NOx cleaning apparatus of an internal combustion engine, comprising:

a NOx catalyst provided at an exhaust system of the internal combustion engine for selectively reducing NOx in an exhaust gas by adsorbing a reducing agent;

a reducing agent supplying unit for supplying the reducing agent to the NOx catalyst;

a NOx exhaust amount deriving unit for one of detecting and estimating an exhaust amount of NOx exhausted from the internal combustion engine;

an actual NOx cleaning rate deriving unit for deriving an actual NOx cleaning rate by the NOx catalyst;

a consumption amount deriving unit for deriving a consumption amount of the reducing agent absorbed to the NOx catalyst based on the NOx exhaust amount detected or estimated by the NOx exhaust amount deriving unit and the actual NOx cleaning rate derived by the actual NOx cleaning rate deriving unit;

an adsorption amount deriving unit for deriving an actual adsorption amount of the reducing agent adsorbed to the NOx catalyst in accordance with the consumption amount of the reducing agent derived by the consumption amount deriving unit and an addition amount of the reducing agent by the reducing agent supplying unit;

a reference NOx cleaning rate deriving unit for deriving a reference NOx cleaning rate based on the actual adsorption amount derived by the adsorption amount deriving unit and one of a catalyst temperature of the NOx catalyst and a parameter correlated with the catalyst temperature; and a correcting unit for correcting the actual adsorption amount derived by the adsorption amount deriving unit in accordance with a result of comparing the reference NOx cleaning rate derived by the reference NOx cleaning rate deriving unit and the actual NOx cleaning rate derived by the actual NOx cleaning rate deriving unit;

a controlling unit for controlling the reducing agent supplying unit in accordance with the actual adsorption amount corrected by the correcting unit.

12. An NOx cleaning method of an internal combustion engine having, a NOx catalyst provided at an exhaust system of the internal combustion engine for selectively reducing NOx in an exhaust gas by adsorbing a reducing agent, and a reducing agent supplying unit for supplying the reducing agent to the NOx catalyst, said method comprising:

(a) a step of detecting or estimating an exhaust amount of NOx exhausted from the internal combustion engine;

(b) a step of deriving an actual NOx cleaning rate by the NOx catalyst;

(c) a step of deriving a consumption amount of the reducing agent adsorbed to the NOx catalyst based on the detected or estimated exhaust amount of NOx detected or estimated in the step (a) and the actual NOx cleaning rate derived in the step (b);

(d) a step of deriving an actual adsorption amount of the reducing agent adsorbed to the NOx catalyst in accordance with a sum of a difference of an addition amount of the reducing agent by the reducing agent supplying unit and the consumption amount of the reducing agent derived in the step (c) and a derived value of the adsorption amount at a preceding time in the step (d);

(e) a step of deriving a reference NOx cleaning rate based on the actual adsorption amount derived in the step (d) and a catalyst temperature of the NOx catalyst or a parameter correlated with the catalyst temperature; and (f) a step of correcting the actual adsorption amount derived in the step (d) in accordance with a result of comparing the reference NOx cleaning rate derived in the step (e) and the actual NOx cleaning rate derived in the step (b);

(g) a step of controlling the reducing agent supplying unit in accordance with the actual adsorption amount corrected by the step (f).

* * * * *